UNITED STATES PATENT OFFICE.

EDWARD H. WILLIAMS, OF SHARON, PENNSYLVANIA.

SILICATED FLUE-DUST.

SPECIFICATION forming part of Letters Patent No. 723,106, dated March 17, 1903.

Application filed October 24, 1901. Serial No. 79,885. (No specimens.)

*To all whom it may concern:*

Be it known that I, EDWARD H. WILLIAMS, a citizen of the United States, residing at Sharon, in the county of Mercer and State of Pennsylvania, have invented a certain new and useful Improvement in Agglomerated Iron Ore for Smelting, of which the following is a full, clear, and exact description, reference being had to the accompanying drawings.

In the reduction of certain iron ores, notably those from the Massaba range, in a blast-furnace a fine impalpable powder, known as "flue-dust," is developed and is carried off by the draft of waste gases. Though this powder is rich in iron, being in the instance of a Massaba ore a ferric oxid, ($F_2O_3$,) it is so very impalpable that it has not been, so far as I am aware, heretofore utilized to any material extent, being simply added to the dump, for if it be reintroduced into the furnace it is simply blown out again by the blast. I have discovered that if this powder be fused with a small percentage of silica ($SiO_2$) the silica is converted into a ferrous silicate, and this binds the remaining oxid into a slag, which can be very conveniently utilized in the blast-furnace. The amount of silica which should be added in making my proposed slag varies with circumstances. I have found seven per cent. to be satisfactory, though this silica may vary from two per cent. to twelve per cent., and to express substantially the range comprised between limits I use the term "small per cent." This small per cent. of silica added is a free silica, by which I mean sand, gravel, or other material high in silica which is not refuse. For the proper utilization of the flue-dust it is essential that the additional material fed to the furnace to constitute a part of the binder does not itself take into the product unsatisfactory ingredients, such as would be contained in refuse slag, &c.

An efficient method of making my composition of matter is by the process which is the subject of my copending application, Serial No. 44,363, filed January 23, 1901, entitled "Process of reclaiming flue-dust." In such process I fuse the flue-dust and the silica by feeding them both under the surface of a molten bath of iron oxid and iron silicate contained in a reverberatory furnace, the heat being applied to the surface of the bath and the resultant slag being drawn off as the process continues.

I am aware that there have been various slags and cinders which contained iron oxid and ferrous silicate; but such slags do not have the small per cent. of silica which my invention calls for nor do they have these ingredients alone, but have so much silica and other ingredients as not to be utilizable in the furnace.

I claim—

1. A composition of matter consisting of uncombined iron oxid and iron silicate free from impurities.

2. A composition of matter consisting of uncombined iron oxid, together with a small percentage of substantially pure iron silicate binding the oxid into a slag.

3. A composition of matter consisting of uncombined iron oxid, together with a small proportion of iron silicate derived from free sand, binding the oxid into a slag.

In testimony whereof I hereunto affix my signature in the presence of two witnesses.

E. H. WILLIAMS.

Witnesses:
DAVID KENNEDY,
PAUL D. FARRELL.